United States Patent
Pattan et al.

(10) Patent No.: US 9,043,394 B2
(45) Date of Patent: May 26, 2015

(54) SYSTEM AND METHOD FOR TRANSMITTING SYSTEM MESSAGES INSESSION INITIATION PROTOCOL

(75) Inventors: Basavaraj J Pattan, Bangalore (IN); Radhika Raghavendran, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1836 days.

(21) Appl. No.: 11/503,279

(22) Filed: Aug. 11, 2006

(65) Prior Publication Data

US 2007/0043872 A1     Feb. 22, 2007

(30) Foreign Application Priority Data

Aug. 12, 2005 (IN) .............. 1124/CHE/2005

(51) Int. Cl.
*G06F 15/16* (2006.01)
*H04L 29/06* (2006.01)
*H04L 29/08* (2006.01)

(52) U.S. Cl.
CPC ...... *H04L 65/1043* (2013.01); *H04L 29/06027* (2013.01); *H04L 65/1006* (2013.01); *H04L 67/14* (2013.01)

(58) Field of Classification Search
USPC ......... 709/204, 227, 203; 379/202.01, 201.01
See application file for complete search history.

(56) References Cited

U.S. PATENT DOCUMENTS

| | | | |
|---|---|---|---|
| 5,928,331 A | 7/1999 | Bushmitch | |
| 6,108,714 A | 8/2000 | Kumagai et al. | |
| 6,480,957 B1 | 11/2002 | Liao et al. | |
| 7,024,688 B1 | 4/2006 | Faccin et al. | |
| 7,277,533 B2 * | 10/2007 | Gilleland | 379/201.01 |
| 2002/0103850 A1 | 8/2002 | Moyer et al. | |
| 2003/0101190 A1 * | 5/2003 | Horvitz et al. | 707/100 |
| 2003/0212738 A1 * | 11/2003 | Wookey et al. | 709/203 |
| 2004/0095938 A1 | 5/2004 | Ryu | |
| 2006/0153352 A1 * | 7/2006 | Schmidt et al. | 379/202.01 |
| 2007/0130345 A1 * | 6/2007 | Da Palma et al. | 709/227 |

FOREIGN PATENT DOCUMENTS

| | | |
|---|---|---|
| JP | 9-006582 | 1/1997 |
| JP | 11-275069 | 10/1999 |
| KR | 1019990037501 | 5/1999 |
| KR | 1020040073717 | 8/2004 |
| KR | 1020050048221 | 5/2005 |
| KR | 1020050080404 | 8/2005 |
| RU | 2003 105 825 | 7/2004 |
| RU | 2003 134 369 | 3/2005 |
| WO | WO 02/091756 | 11/2002 |

(Continued)

OTHER PUBLICATIONS

Campbell et al., Session Initiation Protocol (SIP) Extension for Instant Messaging, RFC 3428, Dec. 2002.*

(Continued)

*Primary Examiner* — Tammy Nguyen
(74) *Attorney, Agent, or Firm* — The Farrell Law Firm, P.C.

(57) ABSTRACT

Provided is a system and method to accomplish system messaging in SIP by introducing a new content in the form of MIME body and a new feature tag to the existing SIP framework, for transmitting service specific information and receiving the user response. System Messages may contain a list of possible options and require a response from the user.

17 Claims, 5 Drawing Sheets

(56) References Cited

FOREIGN PATENT DOCUMENTS

| WO | WO 03/096603 | 11/2003 |
| WO | WO 2004/086715 | 10/2004 |
| WO | WO 2004/092867 | 10/2004 |
| WO | WO 2005/062703 | 7/2005 |
| WO | WO 2005/067449 | 7/2005 |

OTHER PUBLICATIONS

B. Campbell, "The Message Session Relay Protocol", Internet-Draft Online, Feb. 20, 2005.
G. Klyne, "MIME Content Types in Media Feature Expressions", Network Working Group, Online, Standards Track, Sep. 2000.
Donovan, "RFC 2976—The SIP INFO Method", Oct. 2000.
Rosenberg et al., "SIP: Session Initiation Protocol", RFC 3261, Jun. 2002.
European Search Report dated Feb. 13, 2015 issued in counterpart application No. 14186165.8-1853.
Open Mobile Alliance, Samsung Electronics: "System Messages"OMA-IM-2005-0608-SystemMessagesProposal, Aug. 11, 2005.
Open Mobile Alliance, Instant Messaging Requirements, Candidate Version 1.0, OMA-RDInstant Messaging-V10-20041118-C, Nov. 18, 2004.

* cited by examiner

SYSTEM AND METHOD FOR TRANSMITTING SYSTEM MESSAGES INSESSION INITIATION PROTOCOL

PRIORITY

This application claims priority under 35 U.S.C. §119 to an application entitled "System And Method For System Messages In SIP" filed in the Indian Industrial Property Office on Aug. 12, 2005 and assigned Serial No. 1124/CHE/2005, the contents of which are incorporated herein by reference.

BACKGROUND OF THE INVENTION

1. Field of the Invention

The present invention relates generally to Session Initiation Protocol (SIP) technology, and in particular, to a method for transmitting System Messages to various SIP based service subscribers such as Instant Messaging (IM), Push-to-Talk Over Cellular (PoC), Multimedia Messaging Service (MMS) and any other SIP based services hosted by the Service Provider.

The System Message is a special type of message transmitted by the system for different purposes (e.g., advice of charge, service notifications, warnings, instructions, etc). System Messages can contain a list of possible options and require a response from the user.

SIP is a session initiation protocol for controlling a multimedia session over Internet, including, but is not limited to, MESSAGE Method, Message Session Relay Protocol (MSRP) method, and SIP INFO Method.

2. Description of the Related Art

The MESSAGE Method, MSRP Method and SIP INFO Method will be described below.

Message Method—SIP Extension RFC 3428

The MESSAGE Method (refers to Request For Comments (RFC) 3428, "Session Initiation Protocol (SIP) Extension for Instant Messaging", B. Campbell, Ed., et. al., RFC 3428, December 2002) sets forth the MESSAGE method, which is an extension to SIP (refers to RFC 3261, "SIP: Session Initiation Protocol", J. Rosenberg, et. al., RFC 3261, June 2002) that allows for the transfer of Instant Messages. A MESSAGE request is an extension to SIP, thus it inherits all the request routing and security features of SIP protocol. MESSAGE requests carry the content therein in the form of Multipurpose Internet Mail Extension (MIME) body parts. MESSAGE requests do not themselves generate a SIP dialog. Ordinarily, each Instant Message stands independently, much like pager messages. MESSAGE requests can be transmitted in the dialog generated by another SIP request.

MSRP Method

Message Session Relay Protocol (MSRP) (refers to "The Message Session Relay Protocol", B. Campbell, Ed., et. al., draft-ietf-simple-message-sessions) is a protocol for transmitting a series of related instant messages in a session. The MSRP is a text-based, connection-oriented protocol for exchanging arbitrary or binary MIME content, particularly instant messages.

SIP INFO Method—RFC 2976

SIP INFO method (refers to RFC 2976, "The SIP INFO Method", S. Donovan, RFC 2976, October 2000) allows for the carrying of session related control information that is generated during a session.

However, the transferring of system messages using the above-mentioned conventional methods only can give rise to some unexpected critical problems wherein the system messages are substantially not distinguished from normal messages, and a system message related response received from a client is not identified correctly, either. Additionally, these conventional methods have further disadvantages, in that they are precluded from waiting for a specified duration of time while a server is expecting a response from a client, and it is quite difficult for the server to provide for a user-friendly service level access control.

SUMMARY OF THE INVENTION

Accordingly, the present invention has been made to solve the above-mentioned problems occurring in the conventional art, and an aspect of the present invention is to provide a method of transferring system messages for distinguishing the system messages from normal messages.

According to another aspect of the present invention, there is provided a method of transferring system messages for identifying types of responses to be received by a server from a client.

According to a further aspect of the present invention, there is provided a method of transferring system messages for waiting for a specified duration of time while the server is expecting a response from the client.

In still another aspect of the present invention, there is provided a method of transferring system messages for providing for a user-friendly service level access control from the server.

In a still further aspect of the present invention, there is provided a method of transferring system messages, wherein a server transmits the system messages to a client, the server receives a response thereto from the client, and it determines any subsequent actions based upon the policy of a service provider.

In yet still another aspect of the present invention, there is provided a method of transferring system messages applicable to MESSAGE method, MSRP SEND method, and SIP INFO method.

In accordance with an aspect of the present invention for achieving the above and other aspects of the, there is provided a method for transferring system messages in SIP including by a server, introducing a feature tag, indicative of the system messages, into a message header of a SIP message and a Multipurpose Internet Mail Extensions (MIME) content type, indicative of inclusion of system message, related contents into a message body and carrying a system message request Extensible Markup Language (XML) document having system message related contents in the message body, thus creating system messages request corresponding to the current situation for transmitting to a client; and by the client, receiving the system message request, adding the feature tag and the MIME content type to the message header of the SIP message in accordance with the received system message request, and thus creating system messages request carrying a system message response XML document having contents related to the system message request response in the message body for transmitting to the server.

And, the system message request and system message response are transmitted by a MESSAGE, MSRP SEND, INFO or other appropriate SIP method.

Preferably, the feature tag can be carried in an Accept-Contact field of the SIP message header and the MIME content type is carried in Content-Type field.

Preferably, the feature tag can be of "+g.application.smsg" tag and the MIME content type can be of "vnd.example.system-message+xml".

Advantageously, the system message request XML document can begin with a <system-message> root element and the system request message XTML document includes an <smsg-type> element that indicates that the system message is the system message request or the system message response, an <smsg> element that contains a unique identification number in order to associate a system message response to a system message request, an <smsg-text> element that has information to be transmitted to the client, an <smsg-response-type> element that indicates the user of the type of response to be requested to the client in compliance with the system message request, an <answer-options> element of which inclusion is determined by the type of response contained in the <smsg-response-type> element, the element having a concrete content and an identifier of the response, a <verification> element that has a code to confirm that the user has read the system message request, a <time-out> element that indicates a duration of waiting time within which the user response to the system message request is expected, and a <restrict-access> element that allows the server to insist that the client block further access to the corresponding service until the user responds relative to the system message request.

Preferably, the <smsg-response-type> element can include at least one of no-answer, only-one-answer, and multiple-answer for which "no-answer" is used if no response is expected from the user, "only-one-answer" is used if only one of two different answers, accept or refuse, is to be selected, and "multiple-answer" is used if the system messages need to the user's response with multiple answers.

Preferably, the <answer-options> element can not be included in the system message request document if the <smsg-response-type> element value is "no-answer", and if only-one or multiple answers, each <answer-options> element includes an <answer-option-id> a child element having an identifier corresponding to a unique number to identify an answer option, and an <answer-option-text> child element having a text indicative of the concrete meaning of each answer option.

Preferably, the <verification> element can include two child elements of a <verification-text> element and a <verification-uri> element, the <verification-text> element having an alphanumeric code, which the user has to enter in the system message response, and the <verification-uri> element containing Uniform Resource Indicator (URI) of the location of the alphanumeric code.

Preferably, the <time-out> element, <restrict-access> element, and <verification> element are selectively included in the system message request XML document.

Furthermore, the system message response XML document can include the <smsg-type> element, the <smsg> element, <answer> element having the answer of the user to the system message request, and the <verification> element having an alphanumeric row entered from the user in correspondence with the alphanumeric row included in the <verification> element of the system message request.

BRIEF DESCRIPTION OF THE DRAWINGS

The above and other objects, features and advantages of the present invention will become more apparent from the following detailed description of the invention taken in conjunction with the accompanying drawings, wherein.

DETAILED DESCRIPTION OF THE PREFERRED EMBODIMENTS

Figure 1:
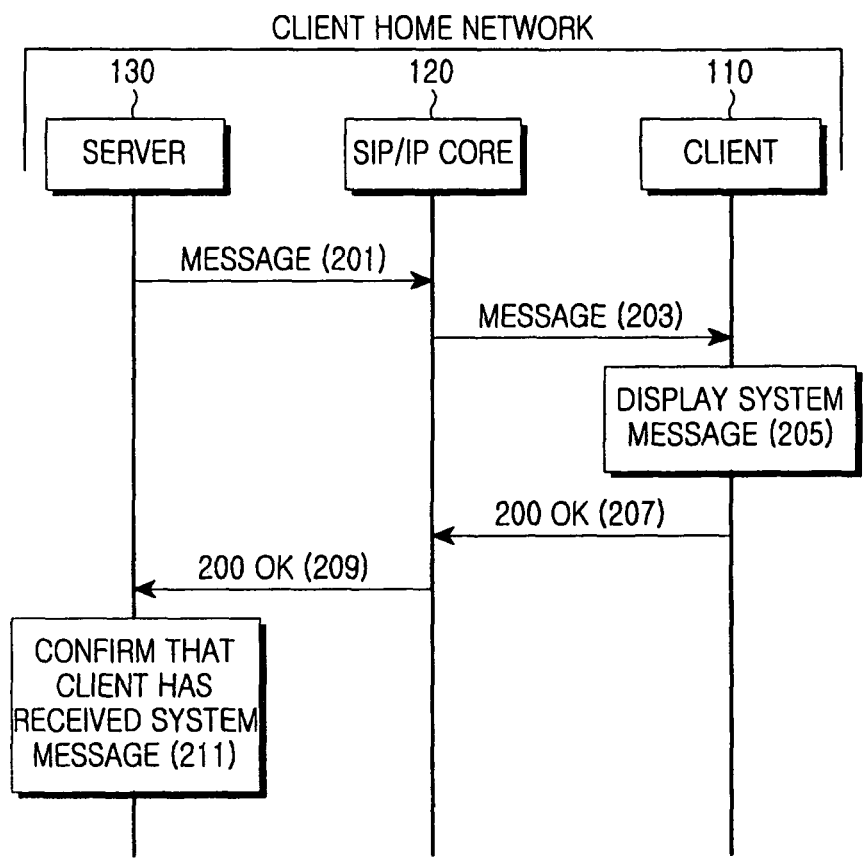
FIG. 1 is a flow diagram illustrating the control process of receiving System Messages Request from a server by a client.

Hereinafter a preferred embodiment of the present invention will be described with reference to the accompanying drawings. In the following description of the present invention, a detail description of known functions and configurations incorporated herein will be omitted when it can obscure the subject matter of the present invention.

System Message is a special type of message transmitted by the system for different purposes (e.g., advice of charge, service notifications, warnings, instructions, etc). These System Messages can have a list of possible options and require a response from a user. The period to transmit such messages is based on the policy of a service provider. The end-user's response can be used to influence the service negotiation.

This invention provides a method for transferring system message to comprehend various system message requirements by introducing a new content to the form of MIME of an SIP message body, introducing a new feature tag to the existing SIP message header, and then transferring it as a system message, for transmitting information and receiving the user's response. The method of carrying the new content in the body of MIME type of the SIP message could be applied to, for example, MESSAGE method, MSRP SEND method, SIP INFO method, etc.

The Client and the Server have to support the System Messages feature. Further, the Client and Server have to specifically identify the System Messages, distinguishing System Messages from the other normal messages. Therefore, according to the present invention, introducing a new feature tag into a message header of the SIP message can help the Server determine whether a Client supports System Messages, and also for both the transmitting and receiving systems to uniquely identify a System Message. The new feature tag can be referred to as "+g.application.smsg", and this new feature tag is applicable to any service such as, for instance, IM service, PoC service and MMS service. ASN.1 Identifier of the feature tag, i.e., "+g.application.smsg." is a new assignment by IANA and the feature tag indicates that the Client supports System Messages. Values appropriate for use with this feature tag are Boolean. The feature tag is intended primarily for use in the following applications, protocols, services, or negotiation mechanisms and is also most useful in a communications application, for describing the capabilities of a device, such as a phone or PDA.

One example of such a typical use can be of Routing a System Message to a mobile phone that can support System Messages. The new feature tag has to be registered by the Client during the step of SIP REGISTER. SIP header field is used to indicate the support of System Messages, so that, for example, Accept-Contact header can be used to carry the new feature tag along with 'require' and 'explicit' parameters according to rules and procedures of RFC 3841 "Caller Preferences for the Session Initiation Protocol". The new feature tag can be used in various SIP methods for System Messages. Irrespective of whether the System Message is transmitted within a session, SIP MESSAGE method can be used for transmitting and receiving System Messages in the present invention. Also, the SIP INFO method and MSRP SEND method can be applied to the present invention for transmitting System Messages during the session.

According to the present invention, a new MIME type has to be defined for System Messages. The new MIME type is uniquely identified, for example, with "vnd.example.system-message+xml" MIME content type. This MIME content type is used to identify that the SIP MESSAGE body has a System Message confirming to a particular schema (XML schema). The new MIME content type is applicable to any service for e.g. IM service, PoC service, and MMS service. Further, the new MIME content type has to be indicated in various SIP methods for System Messages. Irrespective of whether the System Message is transmitted within a Session, SIP MESSAGE method can be used for transmitting and receiving System Messages, and also, SIP INFO method and MSRP SEND method can be used for transmitting System Messages during the session. The new MIME type can be carried in the header field of SIP MESSAGE, for example, in the content-type header.

In the meantime, the system messages according to the new MIME content type is carried in the message body of the various SIP methods during transmitting and receiving System Messages. Hence, the message body has to be described based on the new schema defined by the new MIME content type. System Messages are transmitted to the Client, only when it is necessary, for instance, such as the first time use, etc. So, the Server maintains a state from which Service Provider can be aware of whom the System Message is already transmitted and to whom it is yet to transmit. Thus, the schema in the message body defined by the new MIME content type may be defined in such a manner that the System Messages that can be used by the Server to transmit the same should have the same schema as messages used by the Client to respond back to the Server. For example, it is possible to have a single schema that can accomplish both System Message Request and System Message Response.

Hereinafter a description is made of the structure of the System Message Request document. The System Message Request is an XML document that must be well-formed and has to be valid. This System Request Message document is based on XML 1.0 and uses Unicode Transformation Formation 8 (UTF-8) encoding. This invention makes use of XML namespaces for uniquely identifying System Message Request documents or fragments of the document. The namespace Uniform Resource Identifier (URI) for elements defined by the detailed description of the present invention is a Uniform Resource Names (URN), using the namespace identifier 'example'. This URN is as set forth below:

"urn:example:params:xml:ns:application:system-message"

Such a System Message Request document can begin with the <system-message> root element, and it can further include an <smsg-type> element, an <smsg> element, an <smsg-text> element, an <smsg-response-type> element, an <answer-options> element, an <answer-option-id> element, an <answer-option-text> element, a <verification> element, a <verification-text> element, a <verification-uri> element, a <time-out> element, and a<restrict-access> elements. Definitions of each element are provided in the following Table 1.

TABLE 1

| Name of element | Contents described in element |
| --- | --- |
| smsg-type | indicates whether "request" or "response" |
| smsg | unique number to associate the response to the request |

TABLE 1-continued

| Name of element | Contents described in element |
| --- | --- |
| smsg-text | System Message Text |
| smsg-response-type | requested response type "no-answer" or "only-one-answer" or "multiple-answer" |
| answer-options | list of answer options |
| answer-option-id | a unique number to identify an answer option |
| answer-option-text | free text answer option |
| verification | to confirm that the User has read the System Message |
| verification-text | verification code that user has to re-enter in the response |
| verification-uri | URI of the location from where user has to enter the code in the response |
| Time-out | duration within which the user response is expected |
| restrict-access | insists the client to block further access to the service until user responds to a System Message |

Referring to Table 1 above, a detailed description will be made with respect to the respective elements as stated above.

The <smsg-type> element indicates that System Message is of the type "request", which means it is from Server to Client. The <smsg> element is an element that includes a unique identification number given to associate the response to a System message request. This element enables the system to simultaneously transmit more than one System Messages, thereby reducing messaging and signaling overhead. Also, it helps in associating the response to the system message request at Server end, which can be received at a later time from the Client.

The <smsg-text> is an element that gives some information to be rendered to the User. The <smsg-response-type> element is an indicator that informs the user of the type of response expected from the User in answer to the system message request, the response having "no-answer" or "only-one-answer" or "multiple-answer", wherein "no-answer" is used in case where the System Messages transmitted by the Server is only for the User's information and no response is expected from the User, "only-one-answer" is used in case where the System Messages transmitted by the Server need to know the User's response with only Accept/Refuse or Yes/No kind of response, and "multiple-answer" is used in case where the System Messages transmitted by the Server need to know the User's response with multiple answers. The Server decides on the value in <smsg-response-type> element based on the kind of response to require the user. The Client has to respond back accordingly with the type of response as requested by the Server.

The <answer-options> element is an element describing possible answer options that can be selected by the user and can consist of a number of elements. When this element is present, it means the Server is expecting a response from the User. Therefore, the <answer-options> element is not present in case the <smsg-response-type> element value is "no-answer". The <answer-options> will allow the Client to display the answer options from which the User can select. In case of only-one-answers or multiple answers, each answer-options pair includes a unique ID and a text message indicating the meaning of the option. The unique ID helps the Server to identify the choice made by the User in the response to the System Message. Each <answer-options> element includes <answer-option-id> element, which corresponds to a unique number to identify an answer option, and <answer-option-text> element, which is an element to give free text explaining corresponding answer option. If this child element is not present, then it means the Client will give an option to the user to fill in the answer.

The <verification> element is an element to confirm that the User has read the System Message. If this field is present, then it indicates that the Server requires an acknowledgement to state that the user has read the message. It is optional whether to include this <verification> element and it is decided by the Server. This <verification> element has as a child element one of the following two child elements, that is, <verification-text> and <verification-uri> elements, wherein the <verification-text> element describes an alpha numeric code which the user has to re-enter in the System Message response, and the <verification-uri> element describes URI value indicating the location of code which user has to insert the code in the System Message response.

The <time-out> element is an element to inform the user of a time duration within which the user response is expected. This element has the condition where the Server expects the user response to System Message within a certain time/duration. If the user does not respond within the described time/period, the Server can decide the future course of action based on its local policy. It is optional whether to include this <time-out> element and decided by the Server.

The <restrict-access> element is an element to allow the Server to assist the client to block further access to the service until user responds to a System Message. This element is also optional for inclusion and decided by the Server. If the server requests for blocking access to the service through the <restrict-access> element, the Client should not allow the User to have further access to the service. Hence, in case where Server wants to restrict the service access until client responds, the Server maintains a state of access and waiting for the response until the timeout, and in case of time-out decides further action based on the Service Provider policy. The Server can retransmit the System Message in a state of time-out, but the retransmission of the System Message is decided according to the Service Provider's policy. A System Message Request document shall be identified with the MIME content type "vnd.example.system-message+xml".

An XML schema of the system message request document illustrated in Table 2 is described below in Table 2.

TABLE 2

```
<!-- XML schema for System Message request -->
<?xml version="1.0" encoding="UTF-8"?>
<xs:schema
   targetNamespace="urn:oma:params:xml:ns:im:system-message"
   xmlns:xs="http://www.w3.org/2001/XMLSchema"
   xmlns="urn:oma:params:xml:ns:im:system-message"
   elementFormDefault="qualified"
   attributeFormDefault="unqualified">
 <xs:element name="system-message">
  <xs:complexType>
    <xs:sequence>
      <xs:element name="smsg-type" minOccurs="1">
       <xs:simpleType>
         <xs:restriction base="xs:string">
           <xs:enumeration value="request"/>
         </xs:restriction>
       </xs:simpleType>
      </xs:element>
      <xs:element name="smsg" minOccurs="1"
      maxOccurs="unbounded">
       <xs:complexType>
         <xs:sequence>
           <xs:element name="smsg-text" type="xs:string"
           minOccurs="1" />
           <xs:element name="smsg-response-type" minOccurs="1">
            <xs:simpleType>
              <xs:restriction base="xs:string">
                <xs:enumeration value="no-answer"/>
                <xs:enumeration value="only-one-answer"/>
                <xs:enumeration value="multiple-answer"/>
```

TABLE 2-continued

```
              </xs:restriction>
            </xs:simpleType>
           </xs:element>
           <xs:element name="answer-options" minOccurs="0"
           maxOccurs="unbounded">
            <xs:complexType>
              <xs:sequence>
                <xs:element name="answer-option-id" type="xs:string"
                minOccurs="1" />
                <xs:element name="answer-option-text" type="xs:string"
                minOccurs="0" />
              </xs:sequence>
            </xs:complexType>
           </xs:element>
           <xs:element name="time-out" type="xs:positiveInteger"
           minOccurs="0" />
           <xs:element name="restrict-access" type="xs:empty"
           minOccurs="0" />
           <xs:element name="verification" minOccurs="0">
            <xs:complexType>
              <xs:choice>
                <xs:element name="verification-text" type="xs:string"
                minOccurs="0" />
                <xs:element name="verification-uri" type="xs:anyURI"
                minOccurs="0" />
              </xs:choice>
            </xs:complexType>
           </xs:element>
         </xs:sequence>
         <xs:attribute name="id" type="xs:string" use="required"/>
       </xs:complexType>
      </xs:element>
```

An example of the System Message Request document including the aforementioned elements according to the present invention is shown below in Table 3.

TABLE 3

```
<?xml version="1.0" encoding="UTF-8"?>
<system-message
   xmlns="urn:example:params:xml:ns:application:system-message"
   xmlns:xsi="http://www.w3.org/2001/XMLSchema-instance"
xsi:schemaLocation="urn:example:params:xml:ns:application:system-
message">
  <smsg-type>request</smsg-type>
  <smsg id = "abc123">
    <smsg-text>This is first system message</smsg-text>
    <smsg-response-type>no-answer</smsg-response-type>
    <verification>
      <verification-text>eryu463jdfh</verification-text>
    </verification>
  </smsg>
  <smsg id = "ghi789">
    <smsg-text>Do you wish to continue with the
service?</smsg-text>
    <smsg-response-type>only-one-answer</smsg-response-type>
    <answer-options>
      <answer-option-id>1</answer-option-id>
      <answer-option-text>Agree</answer-option-text>
    </answer-options>
    <answer-options>
      <answer-option-id>2</answer-option-id>
      <answer-option-text>Disagree</answer-option-text>
    </answer-options>
    <verification>
    <verification-uri>http://mysite.mydomain.com</verification-uri>
    </verification>
    <timeout>60</timeout>
  </smsg>
  <smsg id = "def456">
    <smsg-text>This is third system message</smsg-text>
    <smsg-response-type>multiple-answer</smsg-response-type>
    <answer-options>
      <answer-option-id>1</answer-option-id>
      <answer-option-text>first option to
user</answer-option-text>
    </answer-options>
```

TABLE 3-continued

```
    <answer-options>
        <answer-option-id>2</answer-option-id>
        <answer-option-text>second option to
user</answer-option-text>
    </answer-options>
    <answer-options>
        <answer-option-id>3</answer-option-id>
    </answer-options>
    <verification>
        <verification-text>4dfjk9067fh</verification-text>
    </verification>
    <timeout>90</timeout>
    <restrict-access/>
  </smsg>
</system-message>
```

Next, description is made to the structure of the System Message Response document. The System Message Response document is an XML document that must be well-formed and has to be valid. System Message Response document is based on XML 1.0 and uses UTF-8 encoding. This invention makes use of XML namespaces for uniquely identifying System Message Response documents or fragments of the documents. The namespace URI for elements defined by this invention is a URN, using the namespace identifier 'example'. This URN is as described below:

urn:example:params:xml:ns:application:system-message

The System Message Response document begins with the <system-message> root element, and it can further include an <smsg-type> element, an <smsg> element, an <answer> element, an <answer-id> element, an <answer-text> element, and a <verification> element. The definitions of the respective elements are shown in Table 4 below.

TABLE 4

| Name of element | Contents described in element |
| --- | --- |
| smsg-type | indicates whether "request" or "response"; |
| smsg | unique number to associate the response to the request; |
| answer | list of selected answers; |
| answer-id | to identify User selected answer option |
| answer-text | optional free text answer |
| verification | to confirm that the User has read the System Message |

Referring to Table 4 above, it is described in further detail with the respective elements thereof.

The <smsg-type> element indicates that the System Message is of the type "response", which means it is from Client to Server. The <smsg> element is an element that has a value included in "id" attribute of <smsg> element of the System Message Request. This element helps to find a match between Request and Response on the Server. This <smsg> element also helps to correlate the responses in cases where there are more than one System Messages transmitted in a single message to reduce messaging and signaling overhead.

The <answer> element is an element to indicate the User selection from a list of answer options and can have a number of elements. This element is a choice among a set of answer options defined in the system Message Request. Each <answer> element has child element <answer-id>. There can be multiple <answer-id> elements if the value in <smsg-response-type> element in the System Message Request is "multiple-answer". This allows the user to transmit multiple answers to a request using the same message. Using only ID serves to reduce a size of the message. Also, each <answer> element may have child element <answer-text> along with <answer-id> where the user entered free text answer is present. The answer response can facilitate the Service Provider to decide on the level of the service to be granted to the User and various factors like password reset, new registration, charging, features etc.

The <verification> element is an element to confirm that the User has read the System Message. For example, the User enters the code which appears in the System Message Request and thus allows the Server to confirm that User has read the system message. Otherwise, this element can be the code that is present at a location described as the specific URI (as mentioned in the System Message Request). If the verification fails from the response provided by the User, the Server policy will decide on the further action. For example, it could be that the Server will not allow further access to the Service and Server can retransmit the System Message. The System Message Response document shall be identified with the MIME content type "vnd.example.system-message+xml".

An XML schema of the system message response document is described below in Table 5.

TABLE 5

```
<!-- XML schema for System Message request -->
<?xml version="1.0" encoding="UTF-8"?>
<xs:schema
    targetNamespace="urn:oma:params:xml:ns:im:system-message"
    xmlns:xs="http://www.w3.org/2001/XMLSchema"
    xmlns="urn:oma:params:xml:ns:im:system-message"
    elementFormDefault="qualified"
    attributeFormDefault="unqualified">
  <xs:element name="system-message">
    <xs:complexType>
      <xs:sequence>
        <xs:element name="smsg-type" minOccurs="1">
        <xs:simpleType>
          <xs:restriction base="xs:string">
              <xs:enumeration value="response"/>
          </xs:restriction>
        </xs:simpleType>
      </xs:element>
        <xs:element name="smsg" minOccurs="0" maxOccurs="unbounded">
          <xs:complexType>
            <xs:sequence>
              <xs:element name="answer" minOccurs="0"
maxOccurs="unbounded">
```

TABLE 5-continued

```
            <xs:complexType>
                <xs:sequence>
                    <xs:element name="answer-id" type="xs:string" minOccurs="0"/>
                    <xs:element name="answer-text" type="xs:string" minOccurs="0"/>
                </xs:sequence>
            </xs:complexType>
        </xs:element>
        <xs:element name="verification" minOccurs="0" maxOccurs"=unbounded">
            <xs:complexType>
                <xs:sequence>
                    <xs:element name="verification-text" type="xs:string"
                        minOccurs="0" />
                </xs:sequence>
            </xs:complexType>
        </xs:element>
    </xs:sequence>
    <xs:attribute name="id" type="xs:string" use="required"/>
    </xs:complexType>
  </xs:element>
 </xs:sequence>
</xs:complexType>
</xs:element>
</xs:schema>
```

An example of the System Message Response document according to the present invention is shown below in Table 6.

TABLE 6

```
<?xml version="1.0" encoding="UTF-8"?>
<system-message
    xmlns="urn:example:params:xml:ns:application:system-message"
    xmlns:xsi="http://www.w3.org/2001/XMLSchema-instance"
xsi:schemaLocation="urn:example:params:xml:ns:application:system-
message ">
    <smsg-type>response</smsg-type>
    <smsg id = "abc123">
        <verification>
            <verification-text>eryu463jdfh</verification-text>
        </verification>
    </smsg>
    <smsg id = "ghi789">
        <answer>
            <answer-id>1</answer-id>
        </answer>
        <verification>
            <verification-text>354agr67h</verification-text>
        </verification>
    </smsg>
    <smsg id = "def456">
        <answer>
            <answer-id>1</answer-id>
            <answer-id>3</answer-id>
            <answer-text>tom</answer-text>
        </answer>
        <verification>
            <verification-text>4dfjk9067fh</verification-text>
        </verification>
```

TABLE 6-continued

```
    </smsg>
</system-message>
```

Figure 2:
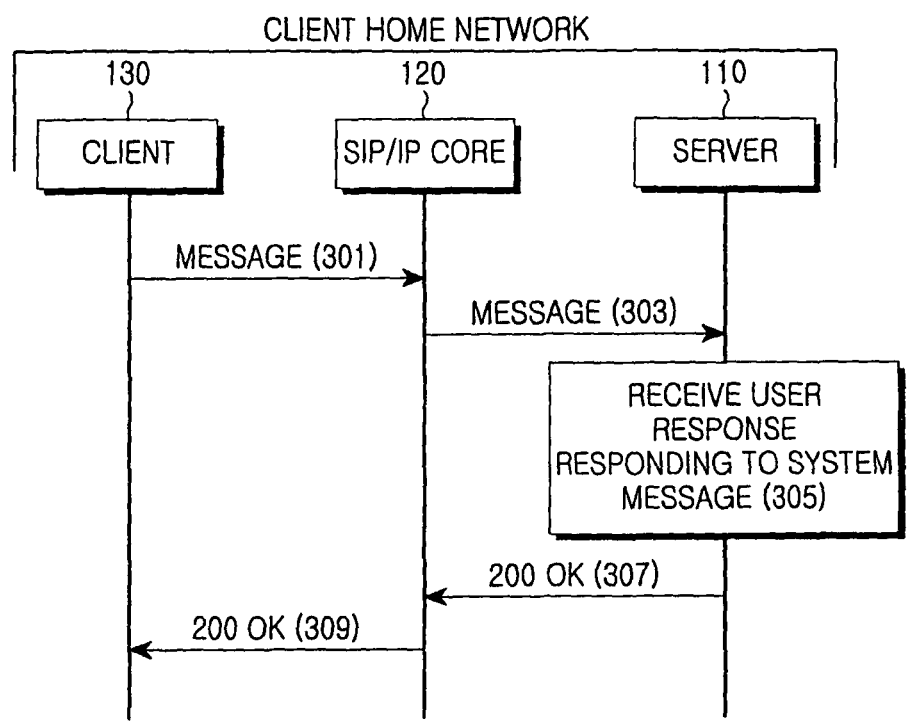
FIG. 2 is a flow diagram illustrating the control process of a client transmitting System Messages Response to a server.

Referring now to FIGS. 1 and 2, description is made to the transferring and receiving procedure of the System Messages, wherein FIG. 1 illustrates the control process of receiving the System Message Request from a Server by a Client, and FIG. 2 illustrates the control process of a Client transmitting the System Messages Response to a Server.

Referring first to FIG. 1, the transferring process of the System Messages Request is described. If a Server X (130) determines that the System Message needs to be transmitted to Client X depending upon the current environment in communications, then it transmits SIP Request Message, i.e., the System Message Request, to SIP/IP Core (120). Here, Request-URI of the SIP Request Message includes an address of a Client X (110), and an Accept-Contact header of the SIP Message header includes the feature tag "+g.application- .smsg". Further, a Content-Type field of the Message Header includes "application/vnd.example.system-message+xml", which is of MIME content type, for indicating that the Message body has the System Message related contents, and the Message body of SIP Message can be configured of an XML document having the System Message Request related contents.

An example of this SIP Request Message is shown in Table 7 below.

TABLE 7

| | |
|---|---|
| Request-URI | sip:UserX@networkX.net |
| SIP HEADERS | |
| P-Asserted-Identity: | "Server X" <sip:ServerX@networkX.net> |
| Accept-Contact: | *;+g.application.smsg; require;explicit |
| Content-Type: | application/vnd.example.system-message+xml |
| XML MIME BODY | |
| | <?xml version="1.0" encoding="UTF-8"?> <system-message |

TABLE 7-continued

```
xmlns="urn:example:params:xml:ns:application:system-message
"
xmlns:xsi="http://www.w3.org/2001/XMLSchema-instance"
xsi:schemaLocation="urn:example:params:xml:ns:application:system
-message ">
<smsg-type>request</smsg-type>
<smsg id = "ghi789">
<smsg-text>Do you wish to continue with the
service?</smsg-text>
<smsg-response-type>only-one-answer</smsg-response-type>
<answer-options>
<answer-option-id>1</answer-option-id>
<answer-option-text>Agree</answer-option-text>
</answer-options>
<answer-options>
<answer-option-id>2</answer-option-id>
<answer-option-text>Disagree</answer-option-text>
</answer-options>
</smsg>
</system-message>
```

In step 203, the SIP IP/Core X (120) transmits the SIP Request Message received from Server (130) to the Client X (110), based on information stored in a registration step. In step 205, the Client X (110) allows the received SIP Request Message, i.e., the System Message Request to be displayed to the User X. Then, in step 207, the Client X (110) transmits a SIP 200 "OK" response to the SIP/IP Core X (120) in order to acknowledge that the System Message Request was received. The SIP 200 "OK" response is transmitted along the signalling path to the Server X, which can be configured as in Table 8 below.

TABLE 8

| SIP HEADERS | |
|---|---|
| P-Asserted-Identity: | "User X" <sip:UserX@networkX.net> |

In step 209, the SIP/IP Core X (120) that has received the SIP 200 "OK" response transmits the response to the Sever X. The Server X (130) receives the SIP 200 "OK" response, thereby confirming that the Client X (110) has received the System Message Request. Referring to FIG. 2, it describes the process of transferring the System Messages Response after the Client X (110) receives the SIP Request Message, that is, the System Message Request, using the new formation of SIP Response Message according to the present invention. As illustrated in FIG. 2, the Client X (110) transmits to SIP/IP Core X (120) the SIP Response Message in answer to the SIP Request Message received in the steps of FIG. 1. Here, Request-URI of the SIP Response Message can include an address of the Server X (130), and an Accept-Contact header of the SIP Message header can include the feature tag "+g.application.smsg". Further, a Content-Type field of the Message header can include "application/vnd.example.system-message+xml", which is of a MIME content type, for indicating that the Message body has a System Message related content, and the Message body of the SIP Message can be configured of an XML document having the System Message Response related contents. An example of this SIP Response Message is shown in Table 9 below.

TABLE 9

| Request-URI | sip:ServerX@networkX.net |
|---|---|
| SIP HEADERS | |
| P-Preferred-Identity: | "User X" <sip:UserX@networkX.net> |
| Accept-Contact: | *;+g.application.smsg; require;explicit |
| Content-Type: | application/vnd.example.system-message+xml |
| XML MIME BODY | |
| | <?xml version="1.0" encoding="UTF-8"?> |
| | <system-message |
| | xmlns="urn:example:params:xml:ns:application: |
| | system-message" |
| | xmlns:xsi="http://www.w3.org/2001/XMLSchema-instance" |
| | xsi:schemaLocation="urn:example:params:xml:ns: |
| | application:system-message "> |
| |   <smsg-type>response</smsg-type> |
| |   <smsg id = "ghi789"> |
| |     <answer> |
| |       <answer-id>1</answer-id> |
| |     </answer> |
| |     <verification> |
| |       <verification-text>354agr67h</verification-text> |
| |     </verification> |
| |   </smsg> |
| | </system-message> |

In step 303, the SIP/IP Core X (120) transmits the received SIP Response Message to the Sever X (130), based upon the feature tag "+g.application.smsg" in the Accept-Contact header. In step 305, the Server X (130) receives the SIP Response Message, thereby receiving a response of the Client X (110) to the System Message Request. Then, in step 307, the Server X (130) transmits to the SIP/IP Core X (120) the SIP 200 "OK" response as shown in Table 10 below.

TABLE 10

| SIP HEADERS | |
|---|---|
| P-Asserted-Identity: | <sip:ServerX@networkX.net> |

Subsequently, the SIP/IP Core X (120) transfers the SIP 200 "OK" response to Client X (110) in step 308.

The present invention provides a method for transferring System Messages to comprehend the various system message requirements by introducing a MIME content type and a new feature tag indicative of those system messages into the message header of SIP message, and also carrying an XML document having system message related contents in the MIME type body of the SIP Message. Here, the SIP message can be realized through MESSAGE method, MSRP SEND method, SIP INFO method, etc.

Figure 3:
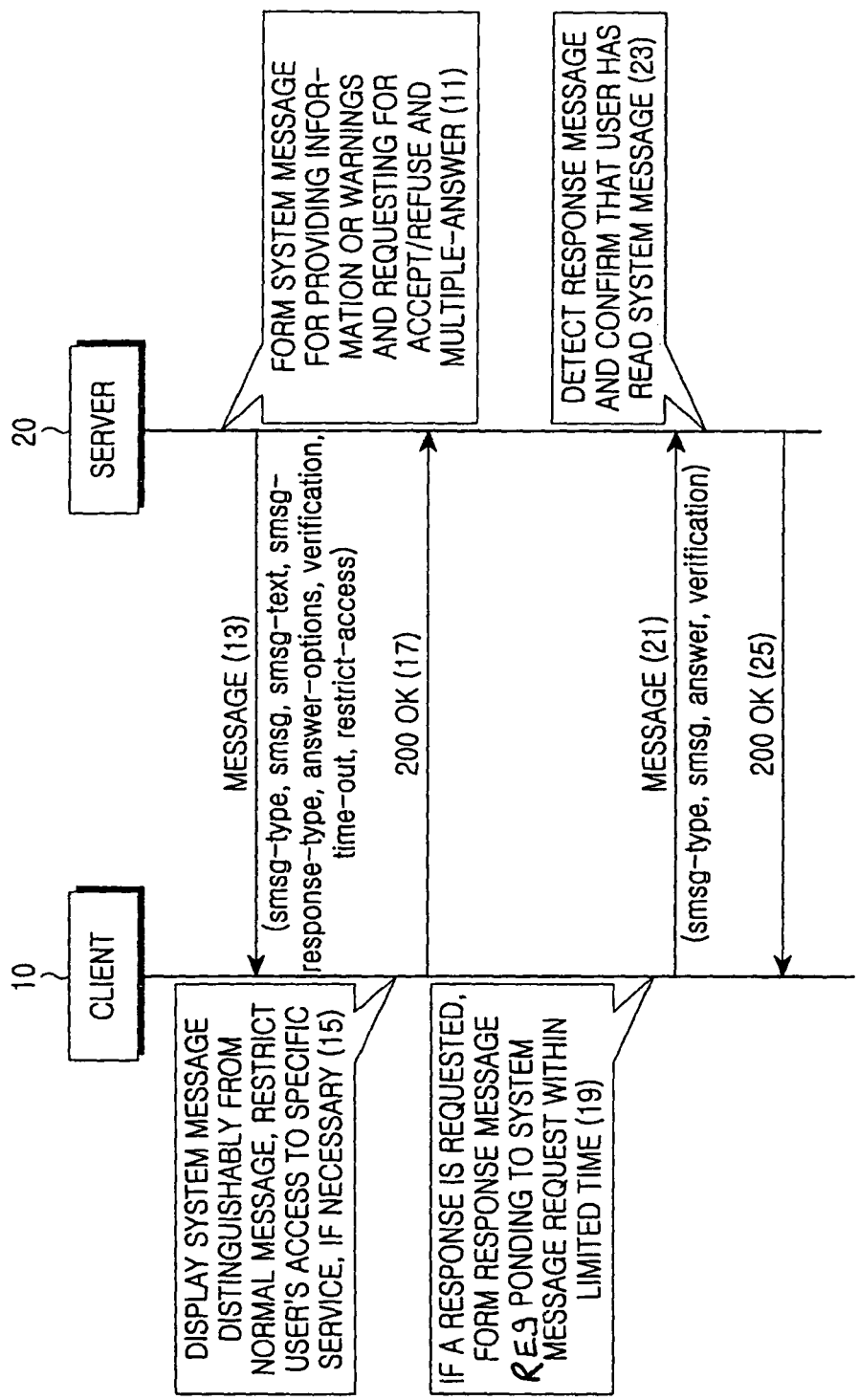
FIG. 3 is a flow diagram illustrating the process of transmitting System Messages according to a general SIP MESSAGE Method.
Figure 4:
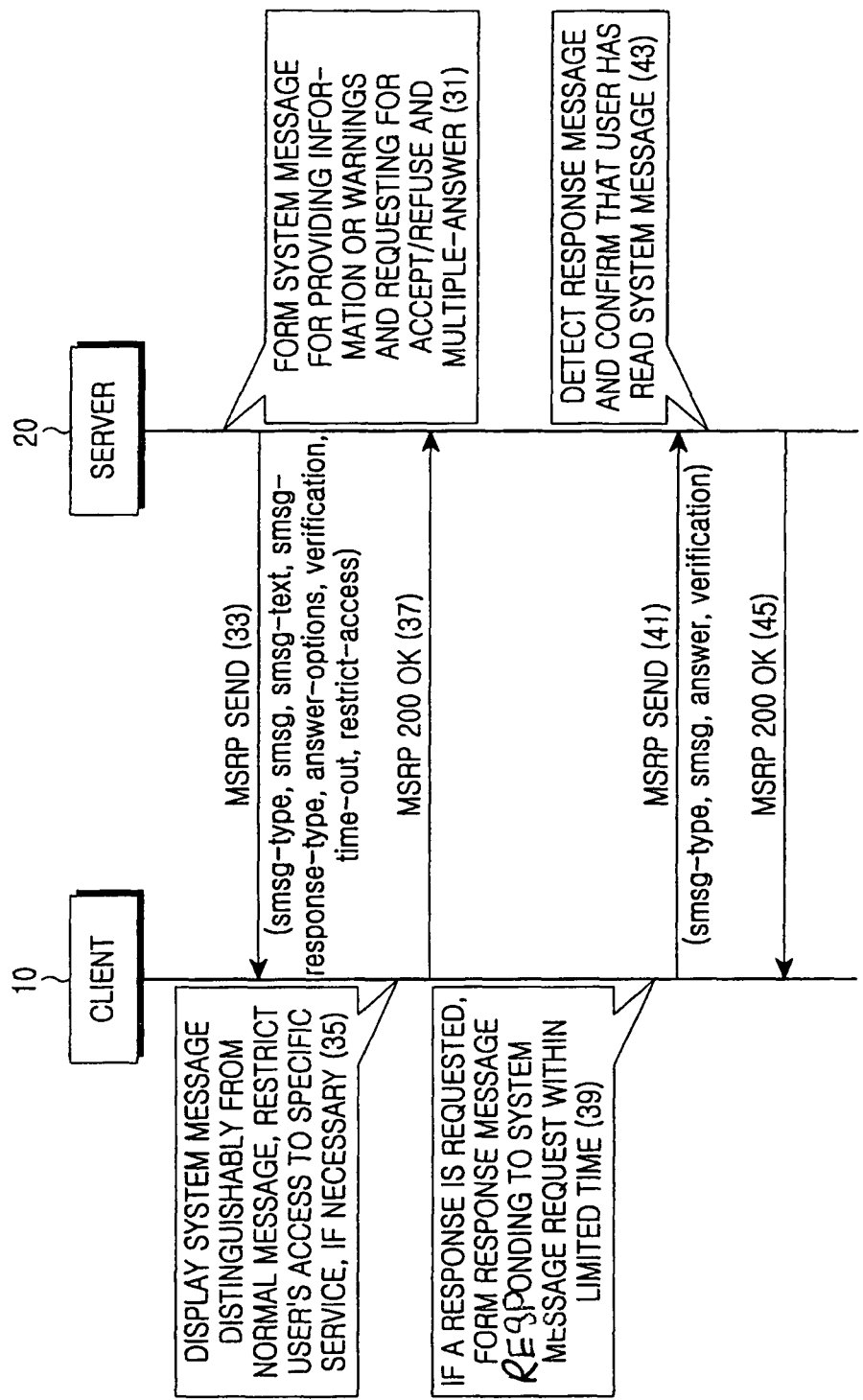
FIG. 4 is a flow diagram illustrating the process of transmitting System Messages according to MSRP SEND Method.
Figure 5:
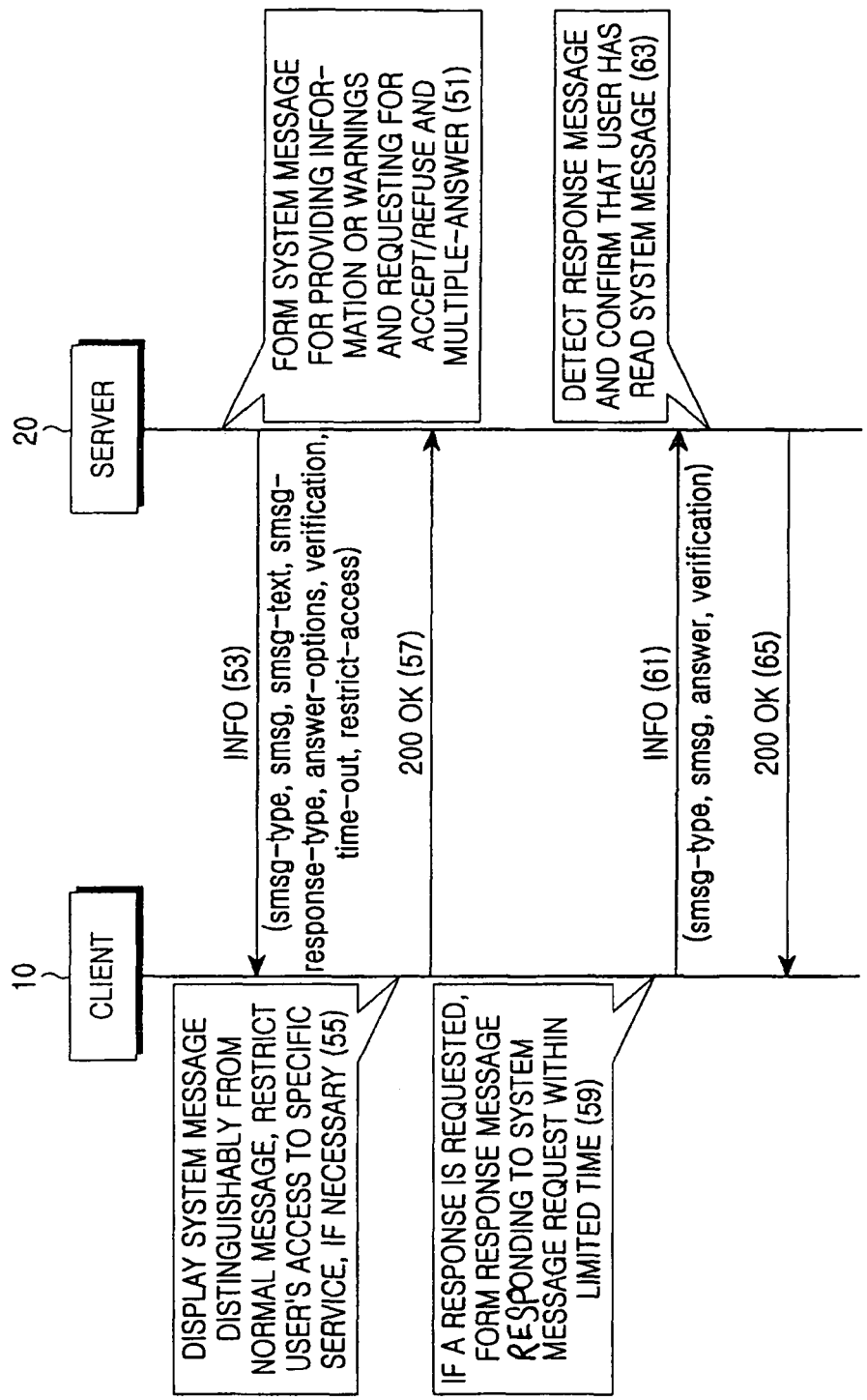
FIG. 5 is a flow diagram illustrating the process of transmitting System Messages according to SIP INFO Method.

Referring to FIGS. 3 to 5, a description is made of the System Message transferring method according to the respective method as described herein-above. In the drawings, FIG. 3 illustrates the process of transmitting System Messages according to a general SIP MESSAGE METHOD, FIG. 4 illustrates the process of sending System Messages according to MSRP SEND METHODM, and FIG. 5 illustrates the process of transmitting System Messages according to SIP INFO METHOD.

In the SIP MESSAGE method, as shown in FIG. 3, the Server 20 makes up in the step 11 the System Message Request for providing information or warning, requesting for Acceptance/Refuse and multiple answers according to the XML schema of the table 2. That is to say, the Server 20 makes up contents included in the System Message Request, using an <smsg-type> element, an <smsg> element, an <smsg-text> element, an <smsg-response-type> element, an <answer-options> element, a <verification> element, a <verification-text> element, and a <restrict-access> element, and then transmits the same by using MESSAGE method to the Client 10 in step 13. In step 15, the Client 10 makes a display of the System Message Request received distinguishably from a normal message, and if requested by the System Message Request, it controls user's access to the specific service, and then transmits in step 17 the SIP 200 "OK" response to the Server 20. Thereafter, in step 19, the Client 10 makes up a Response Message to the System Message Request according to the XML schema of the table 5 within a time predetermined by the System Message Request, if necessary. For example, the Client 10 makes up contents included in the System Message Response, using the <smsg-type> element, the <smsg> element, the <answer> element, the <answer-id> element, the <answer-text> element, and the <verification> element, and then transmits the same by using SIP MESSAGE method to the Server 20 in step 21. Once the Server 20 detects the transmitted Response Message, confirms that the user has read the message, and transmits 200 "OK" response to the Client 10.

In the MSRP SEND method, as shown in FIG. 4, the Server 20 makes up in the step 31 the System Message Request for providing information or warning, requesting for Acceptance/Refuse and multiple answers according to the XML schema of the table 2. For example, the Server 20 makes up contents included in the System Message Request, using the <smsg-type> element, the <smsg> element, the <smsg-text> element, the <smsg-response-type> element, the <answer-options> element, the <verification> element, the <time-out> element and the <restrict-access> element, and then transmits the same by using the MSRP SEND to the Client 10 in step 33. In step 35, the Client 10 makes a display of the System Message Request received distinguishably from normal messages, and if requested by the System Message Request, it controls user's access to the specific service, and then transmits in step 37 the SIP 200 "OK" response to the Server 20. Thereafter, in step 39, the Client 10 makes up a Response Message to the System Message Request according to the XML schema of the table 5 within a time predetermined by the System Message Request. For example, the Client 10 makes up contents included in the System Message Response, using the <smsg-type> element, the <smsg> element, the <answer> element, the <answer-id> element, the <answer-text> element and the <verification> element, and then transmits the same to the Server 20 in step 41 by using MSRP SEND. Once the Server 20 detects the transmitted Response Message, confirms that the user has read the message, and transmits 200 "OK" response to the Client 10.

In the SIP INFO method, as shown in FIG. 5, the Server 20 makes up in the step 51 the System Message Request for providing information or warning, requesting for Acceptance/Refuse and multiple answers according to the XML schema of the table 2 That is to say, the Server 20 make up contents included in the System Message Request, using the <smsg-type> element, the <smsg> element, the <smsg-text> element, the <smsg-response-type> element, the <answer-options> element, the <verification> element, the <time-out> element and the <restrict-access> element, and then transmits the same to the Client 10 in step 53 by using SIP INFO method. In step 55, the Client 10 makes a display of the System Message Request received and if requested by the System Message Request, it controls user's access to the specific service, and then Client 10 transmits in step 57 the 200 "OK" response to the Server 20. Thereafter, in step 59, the Client 10 makes up a Response Message to the System Message Request according to the XML schema of the table 5 within a time predetermined by the System Message Request. For example, the Client 10 makes up various contents included in the System Message Response, using the <smsg-type> element, the <smsg> element, the <answer> element, the <answer-id> element, the <answer-text> element and the <verification> element, and then transmits the same to the Server 20 in step 61 by using the SIP INFO method. The server 20 detects the transmitted response message, confirms that the user has read the system message, and transmits 200 "OK" response to the Client 10.

As appreciated from the foregoing description, the invention provides a method of transferring System Messages using SIP Messages, by introducing a MIME content of the system message type and a feature tag indicative of the system messages into the message header of SIP message, and thereby carrying an XTML document describing System Message related contents in the Message body of the SIP message. Accordingly, the method of transferring system messages using SIP according to the invention makes it possible to distinguish the system messages from normal messages, and for the Server to identify the responses to the system message received from the Client. Further, the method permits to wait for a specified duration of time while the server is awaiting a response from the client, and to provide for a user-friendly service level access control from the server. Furthermore, the Server can transmit the system messages to the Client, and the Server can receive the response thereto from the Client. It is possible for the Server to determine any subsequent actions based upon the policy of a service provider. Moreover, this method of transferring system messages will be applicable to SIP MESSAGE method, MSRP SEND method, and SIP INFO method.

It would be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a computer, mobile communication device, mobile server or a multi function device. Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for transferring system messages using Session Initiation Protocol (SIP) of a client terminal in a system for providing communication service using the SIP, comprising the steps of:
   receiving a system message request from a server;
   making up a system message response corresponding to the received system message request by introducing a feature tag distinguishing the system messages from general SIP messages and a Multipurpose Internet Mail Extensions (MIME) content type indicative of a format of a message included in a message body of an SIP message into a message header of the SIP message, and introducing a system message response document describing content for responding to the system message request in the message body of the SIP message; and
   transmitting the system message response to the server.

2. A client terminal for transferring system messages using Session Initiation Protocol (SIP) in a system for providing communication service using the SIP, the client terminal comprising:
   a transmitter; and
   a client for receiving a system message request from a server through the transmitter, making up a system message response corresponding to the received system message request by introducing a feature tag distinguishing the system messages from general SIP messages and a Multipurpose Internet Mail Extensions (MIME) content type indicative of a format of a message included in a message body of an SIP message into a message header of the SIP message, and introducing a system message response document describing content for responding to the system message request in the message body of the SIP message, and transmitting the system message response to the server through the transmitter.

3. A method for exchanging system messages using Session Initiation Protocol (SIP) by a client device in a system for providing a communication service using the SIP, comprising:
   receiving, at the client device, a request message from a server, wherein the request message includes a first content type indicating that the request message is for requesting a confirmation from a user of the client device, and text to be displayed at the client device for reception of the confirmation;
   displaying the text on the client device;
   receiving, at the client device, the confirmation from the user;
   generating, at the client device, a response message in accordance with the confirmation, wherein the response message includes a second content type indicating that the response message is for responding to the request message; and
   transmitting the response message from the client device to the server.

4. The method of claim 3, wherein the request message and the response message further include a feature tag identifying that the response message is transmitted to or from the client device.

5. The method of claim 3, wherein displaying the text comprises displaying a user interface with at least one button, and the confirmation is inputted on the at least one button.

6. The method of claim 5, wherein the text comprises system message request information of the request message, the text comprises first text to be displayed on a body or title of the user interface and second text to be displayed on the at least one button, and the response message further includes system message response information comprising the confirmation.

7. The method of claim 3, wherein the first content type and the second content type distinguish the system messages from general SIP messages.

8. A client device for exchanging system messages using Session Initiation Protocol (SIP) in a system for providing a communication service using the SIP, comprising:
   a transceiver for receiving a request message from a server, wherein the request message includes a first content type indicating that the request message is for requesting a confirmation from a user of the client device, and text to be displayed at the client device for reception of the confirmation;
   a display unit for displaying the text on the client device;
   an interface unit for receiving the confirmation from the user; and
   a controller for generating a response message in accordance with the confirmation, and controlling the transceiver to transmit the response message to the server, wherein the response message includes a second content type indicating that the response message is for responding to the request message.

9. The client device of claim 8, wherein the request message and the response message further include a feature tag identifying that the response message is transmitted to or from the client device.

10. The client device of claim 8, wherein the display unit displays a user interface comprising at least one button corresponding to the confirmation, and the confirmation is inputted on the at least one button.

11. The client device of claim 10, wherein the text comprises system message request information of the request message, the text comprises first text to be displayed on a body or title of the user interface and second text to be displayed on the at least one button, and the response message further includes system message response information comprising the confirmation.

12. The client device of claim 8, wherein the first content type and the second content type distinguish the system messages from general SIP messages.

13. A method for exchanging system messages using Session Initiation Protocol (SIP) by a server in a system for providing a communication service using the SIP, comprising:
   generating a request message at the server, wherein the request message includes a first content type indicating that the request message is for requesting a confirmation from a user of a client device, and text to be displayed at the client device for reception of the confirmation;
   transmitting the request message from the server to the client device; and
   receiving, at the server, from the client device, a response message in accordance with the confirmation received at the client device, wherein the response message includes a second content type indicating that the response message is for responding to the request message.

14. A server for exchanging system messages using Session Initiation Protocol (SIP) in a system for providing a communication service using the SIP, comprising:
   a controller for generating a request message, wherein the request message includes a first content type indicating that the request message is for requesting a confirmation from a user of a client device, and text to be displayed at the client device for reception of the confirmation; and a transceiver for transmitting the request message to the client device and receiving, from the client device, a response message in accordance with the confirmation received at the client device, wherein the response message includes a second content type indicating that the response message is for responding to the request message.

15. The server of claim 14, wherein the request message and the response message further include a feature tag identifying that the response message is transmitted to or from the client device.

16. The server of claim 14, wherein the text comprises system message request information of the request message, the text comprises first text to be displayed on a body or title of a user interface in the client device and second text to be displayed on at least one button of the user interface, and the response message further includes system message response information comprising the confirmation.

17. The server of claim 14, wherein the first content type and the second content type distinguish the system messages from general SIP messages.

* * * * *